United States Patent
Wang

(10) Patent No.: US 11,620,373 B2
(45) Date of Patent: Apr. 4, 2023

(54) AUTHENTICATION PROTECTION SYSTEM AND METHOD BASED ON TRUSTED ENVIRONMENT, AND STORAGE MEDIUM

(71) Applicant: SANECHIPS TECHNOLOGY CO., LTD., Guangdong (CN)

(72) Inventor: Zuolong Wang, Guangdong (CN)

(73) Assignee: SANECHIPS TECHNOLOGY CO., LTD.

( * ) Notice: Subject to any disclaimer, the term of this patent is extended or adjusted under 35 U.S.C. 154(b) by 546 days.

(21) Appl. No.: 16/627,871

(22) PCT Filed: Jan. 15, 2018

(86) PCT No.: PCT/CN2018/072558
§ 371 (c)(1),
(2) Date: Dec. 31, 2019

(87) PCT Pub. No.: WO2019/007028
PCT Pub. Date: Jan. 10, 2019

(65) Prior Publication Data
US 2020/0125717 A1    Apr. 23, 2020

(30) Foreign Application Priority Data
Jul. 3, 2017    (CN) .......................... 201710532303.1

(51) Int. Cl.
*G06F 21/44*    (2013.01)
*H04L 9/06*    (2006.01)
(Continued)

(52) U.S. Cl.
CPC ............ *G06F 21/44* (2013.01); *H04L 9/0643* (2013.01); *H04L 9/0877* (2013.01);
(Continued)

(58) Field of Classification Search
CPC .. G06F 21/44; G06F 2221/2149; G06F 21/53; H04L 9/0643; H04L 9/0877;
(Continued)

(56) References Cited

U.S. PATENT DOCUMENTS 9,131,382 B1    9/2015    Johns
9,398,026 B1    7/2016    Dall et al.
(Continued)

FOREIGN PATENT DOCUMENTS

CN    105429760 A    3/2016
CN    105991569 A    10/2016
(Continued)

OTHER PUBLICATIONS

Patent Cooperation Treaty (PCT), International Search Report and Written Opinion for Application PCT/CN2018/072558 filed Jan. 15, 2018, dated Mar. 27, 2018, International Searching Authority, CN.
(Continued)

*Primary Examiner* — Mohammad W Reza
(74) *Attorney, Agent, or Firm* — McDonald Hopkins LLC

(57) ABSTRACT

Provided is an authentication protection system based on a trusted environment. The system includes: a client application, a trusted execution environment (TEE) processing unit, a daemon application and a trusted application; where the client application is configured to issue a security authentication business request to the TEE processing unit for calling a security business; the TEE processing unit is configured to forward the security authentication business request to the daemon application and the trusted application
(Continued)

separately, return a verification result to the client application, and create a session connection for the client application and the trusted application; the daemon application is configured to verify the security authentication business request and the trusted application is configured to conduct a session with the client application and provide a business service for the client application.

9 Claims, 6 Drawing Sheets

(51) Int. Cl.
*H04L 9/08* (2006.01)
*H04L 67/141* (2022.01)
*H04L 67/63* (2022.01)

(52) U.S. Cl.
CPC ............ *H04L 67/141* (2013.01); *H04L 67/63* (2022.05); *G06F 2221/2149* (2013.01)

(58) Field of Classification Search
CPC ....... H04L 67/141; H04L 67/63; H04L 67/14; H04L 63/083
See application file for complete search history.

(56) References Cited

U.S. PATENT DOCUMENTS

| 2008/0168275 | A1* | 7/2008 | De Atley | .................. H04L 9/14 709/219 |
| 2009/0063108 | A1* | 3/2009 | De Atley | .............. G06F 21/577 703/2 |
| 2017/0255775 | A1* | 9/2017 | Sorresso | ............... G06F 21/575 |
| 2017/0289804 | A1* | 10/2017 | Kovacevic | ............ G06F 21/575 |

FOREIGN PATENT DOCUMENTS

| CN | 106161028 A | 11/2016 |
| CN | 106462439 | 2/2017 |
| CN | 106650422 | 5/2017 |
| EP | 3179690 | 6/2017 |
| WO | 2016105861 | 6/2016 |

OTHER PUBLICATIONS

Chinese Office Action and Search Report dated Mar. 24, 2020; Chinese Patent Application No. 201710532303.1.

* cited by examiner

AUTHENTICATION PROTECTION SYSTEM AND METHOD BASED ON TRUSTED ENVIRONMENT, AND STORAGE MEDIUM

CROSS-REFERENCE TO RELATED APPLICATION

This application is a 35 U.S.C. 371 national stage filing of PCT Application No. PCT/CN2018/072558 filed on Jan. 15, 2018, which claims priority to Chinese patent application No. 201710532303.1 filed on Jul. 3, 2017, disclosure of which are incorporated herein by reference in their entirety.

TECHNICAL FIELD

The present disclosure relates to the field of security authentication and, in particular, to an authentication protection system and method based on a trusted execution environment, and a storage medium.

BACKGROUND

With the development of mobile network technologies and mobile terminals, the way in which people acquire information and process transactions gradually shifts from PCs to the mobile terminals. Due to the rapid development and popularization of tablets, smartphones, TV boxes and other devices, increasingly more sensitive information is exposed. However, the openness of operating systems of these devices cannot guarantee the security of these devices, and cases where website accounts are stolen, funds in bank cards are lost, and encrypted files in mobile phone are cracked happen occasionally. Therefore, a hardware-supported isolation execution technology emerges, and a trusted execution environment (TEE) is a technology framework defined by the Global Platform to support software and hardware isolation between a non-trusted execution environment and the trusted execution environment. Security applications are executed by an isolated and extensible execution environment independent of an operating system of a smart mobile terminal.

Security protection is implemented through a security isolation technology. However, in practical applications, it is found that serious security threats still exist, and some security threats may even cause a TEE system to crash. Therefore, how to improve system security of a terminal is a problem to be further solved in the existing art.

SUMMARY

Embodiments of the present disclosure provide a trusted environment-based authentication protection system and method, and a storage medium, to solve the problem of insufficient security.

In a first aspect, an embodiment of the present disclosure provides a trusted environment-based authentication protection system. The system includes a client application, a trusted execution environment (TEE) processing unit, a daemon application and a trusted application.

The client application is configured to issue a security authentication business request to the TEE processing unit for calling a security business.

The TEE processing unit is configured to forward the security authentication business request to the daemon application and the trusted application separately, return a verification result to the client application, and create a session connection for the client application and the trusted application.

The daemon application is configured to verify the security authentication business request.

The trusted application is configured to conduct a session with the client application and provide a business service for the client application.

In a second aspect, an embodiment of the present disclosure provides a trusted environment-based authentication protection method. The method includes steps descried below.

A client application applies to a trusted execution environment (TEE) processing unit for establishing context.

The client application establishes a session with a trusted application.

The client application calls a security business.

The trusted application ends the session.

A daemon application ends the context.

In a third aspect, an embodiment of the present disclosure provides a trusted environment-based authentication protection method. The method includes steps descried below.

A client application in a common environment acquires a security parameter for an information interaction with a trusted application and/or a daemon application in a trusted environment.

The client application processes information to be sent to the trusted application and/or the daemon application based on the security parameter, and sends the information subjected to security processing to the trusted application and/or the daemon application.

The client application processes information sent by the trusted application and/or the daemon application based on the security parameter.

In a fourth aspect, an embodiment of the present disclosure provides a computer storage medium, which is configured to store computer-executable instructions for executing the trusted environment-based authentication protection method described above.

When the trusted environment-based authentication protection system and method, and the storage medium provided by the embodiments of the present disclosure are used, after security verification and detection based on the client application are performed, a calculation is performed on a parameter used in a connection establishment process by using a hash algorithm and a context key, a calculation is performed in a function calling process by using a random number provided by the daemon application as an auxiliary parameter, and comparisons are performed by the daemon application to ensure complete and trusted parameters in each step of a connection process and the continuous and trusted connection process, thereby improving the security of an information interaction between environments with different security levels, and improving system security.

BRIEF DESCRIPTION OF DRAWINGS

The drawings are used to provide a further understanding of the embodiments of the present disclosure, constitute a part of the specification, explain the embodiments of the present disclosure in conjunction with examples of the embodiments of the present disclosure, and do not limit the embodiments of the present disclosure. In the drawings.

DETAILED DESCRIPTION

Figure 1:
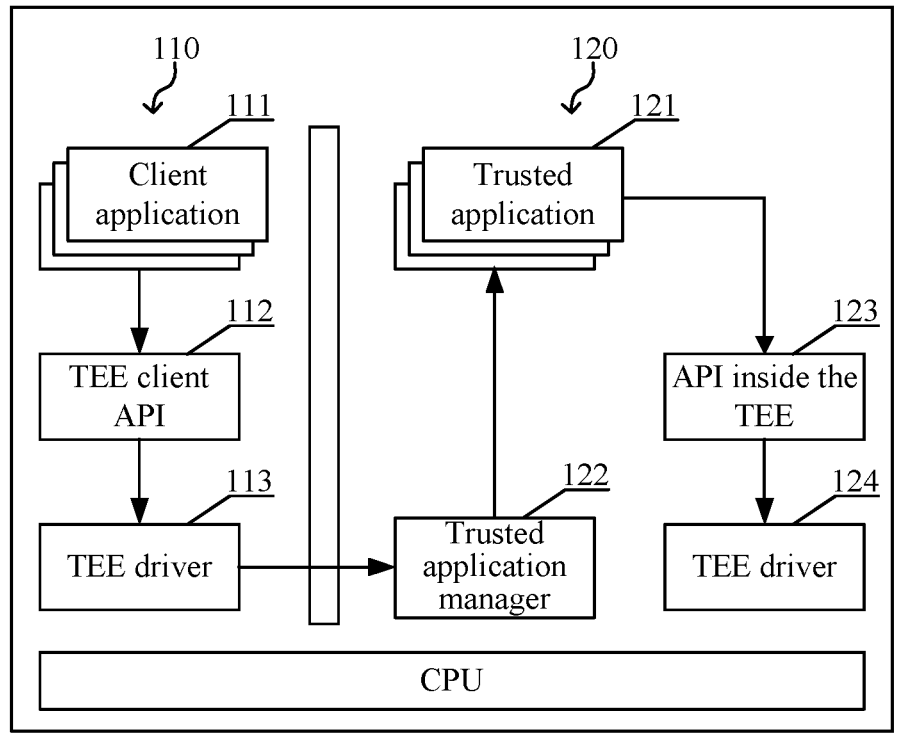
FIG. 1 is a schematic diagram illustrating a design framework of a trusted environment according to an embodiment of the present disclosure.

FIG. 1 is a schematic diagram illustrating a design framework of a trusted environment according to an embodiment of the present disclosure. As shown in FIG. 1, the design framework may include a common environment 110 and a trusted execution environment (TEE) 120 which are two independent environments. The common environment 110 includes a client application (CA) 111, a TEE client application programming interface (API) 112 and a TEE driver 113. The TEE 120 includes a trusted application (TA) 121, a trusted application manager 122, an API 123 inside the TEE and a secure TEE driver 124. The client application 111 in the common environment 110 initiates a request as a client, and the trusted application 121 in a secure environment 120 receives and responds to the request as the corresponding end, thereby organizing a set of interactive processes.

Figure 2:
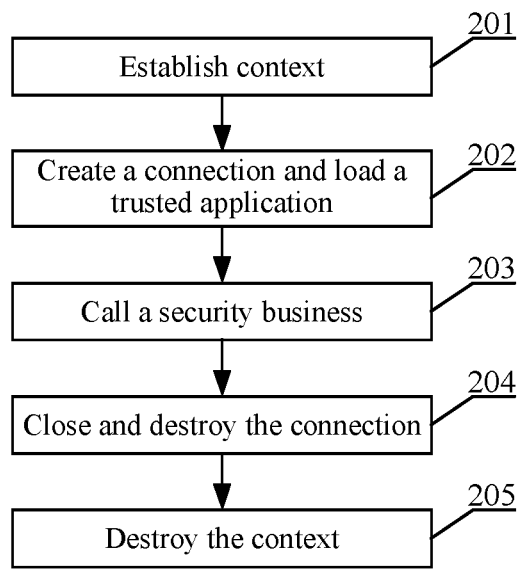
FIG. 2 is a flowchart of trusted environment-based security authentication operation according to an embodiment of the present disclosure.

FIG. 2 is a flowchart of a security authentication process based on the design framework of the trusted environment shown in FIG. 1. An authentication process between the client application and the trusted application under the TEE framework is described below.

In step 201, context is established. The client application issues an application to a TEE security framework, and the TEE confirms whether to create a context resource according to a current system condition.

In step 202, a connection is created and the trusted application is loaded. The client application proposes creating the connection with a universally unique identifier (UUID) to confirm the trusted application to be connected. After receiving the request, the TEE will retrieve whether the current trusted application exists. If the trusted application does not exist, the corresponding trusted application is loaded through an agent program, which requires an authentication operation. After the trusted application is successfully loaded, a structure and a random number are returned to the client application. If the trusted application already exists in the TEE, a direct result is returned to the client application. When the corresponding trusted application is loaded through the agent program, the client application issues a connection verification request. After receiving the request, the TEE verifies whether the connection is valid, and returns a verification result to the TEE and finally to the client application.

In step 203, a security business is called. When the client application has a requirement for calling the security business, the client application calls a preset parameter and enters the TEE through a handle. The TEE transfers these call parameters and remaps the call parameters to the corresponding trusted applications. The trusted application performs corresponding security business function branch processing according to the received call parameters, and returns the corresponding result to TEE after the security business function branch processing is completed. The TEE remaps the results to the client application. The client application may repeat the above security business request within a validity period of the connection.

In step 204, the connection is closed and destroyed. The client application may send a session handle to the TEE after completing all security business requests according to its own business condition to request the connection to be ended. The TEE notifies the trusted application to end all services, destroys the session handle corresponding to the trusted application, and decides whether to destroy the corresponding trusted application according to its own resource condition.

In step 205, the context is ended and destroyed. The client application applies to the TEE for ending the context. The TEE releases the context and destroys environmental information.

In the above-mentioned TEE framework, merely the security isolation between the secure environment and the common environment is provided, and no security protection is provided for an interaction between a client program and the TEE, that is, any common program may have equivalent call rights of the TEE framework. In addition, from the main current examples of attacks against a TEE operating system, the attacks all start by probing calls on the TEE framework: a call process and data results are analyzed, and the entire TEE operating system is gradually broken through and finally breached. From this point of view, it is inadequate to provide merely the TEE framework and the trusted application, and it is further necessary to ensure the integrity, continuity and credibility of a TEE interaction process. The embodiments of the present disclosure provide a trusted environment-based authentication protection system and method, and a computer storage medium, which not only achieves the security isolation between the common environment and the TEE 120 in the internal of devices, but also performs security processing such as encryption and integrity verification on information interactions in the common environment and the TEE, thereby enhancing the security of an information interaction process and solving the problem of insufficient security in the existing art.

Preferred embodiments of the embodiments of the present disclosure will be described below in conjunction with the drawings. It should be understood that the preferred embodiments described hereinafter are merely intended to describe and explain the embodiments of the present disclosure and not to limit the embodiments of the present disclosure.

Figure 3:
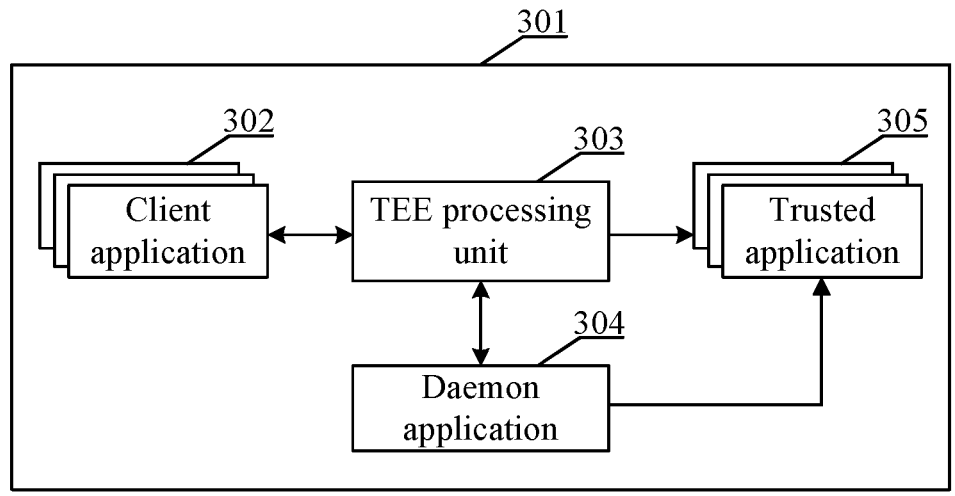
FIG. 3 is a structural diagram of a trusted environment-based authentication protection system according to an embodiment of the present disclosure.

FIG. 3 is a structural diagram of a trusted environment-based authentication protection system according to an embodiment of the present disclosure. As shown in FIG. 3, a trusted environment-based authentication protection system 301 in the embodiment of the present disclosure includes a client application 302, a TEE processing unit 303, a daemon application 304 and a trusted application 305.

The client application 302 is configured to issue a security authentication business request to the TEE processing unit 303 and perform an information interaction with the TEE processing unit 303. The security authentication business request includes a request for establishing context, a request for establishing a trusted connection, a request for calling the security business, a request for ending a session, a request for ending the context and the like.

The client application 302 is configured to send identity authentication information to the TEE processing unit 303 and send a request for applying to establish the context, extract an initial secret KEY from the received KEY, and establish a connection and the session with the TEE processing unit 303.

The TEE processing unit 303 is configured to receive the security authentication business request from the client application 302 and perform corresponding processing. The TEE processing unit 303 forwards the request for applying to establish the context from the client application 302 to the daemon application 304, forwards an encryption verification secret key generated by the daemon application 304 to the client application 302, establish the session with the client application 302 and verify a request for calling a security business from the client application 302. The TEE processing unit 303 designates a hash algorithm for the daemon application 304 to perform a calculation by using the hash algorithm and obtain a calculation result. The hash algorithm may be a same hash algorithm or a dynamically updated hash algorithm in the interaction process. The hash algorithm may be HMAC_SHA256, HMAC_SHA512 or MD5.

The daemon application 304 is configured to: verify information for verification sent by the client application 302, and based on a result of the verification, send the result to the client application 302 and/or a secret key and a random number for subsequently generating the information for verification. The secret key and the random number are generated randomly. The daemon application 304 performs a calculation on the recorded secret key by using the same hash algorithm as that used by the client application 302, and compares the result with the information for verification to implement verification.

In this embodiment, the hash algorithm may also be replaced with a security algorithm.

The trusted application 305 is configured to execute or close the trusted application.

Figure 4:
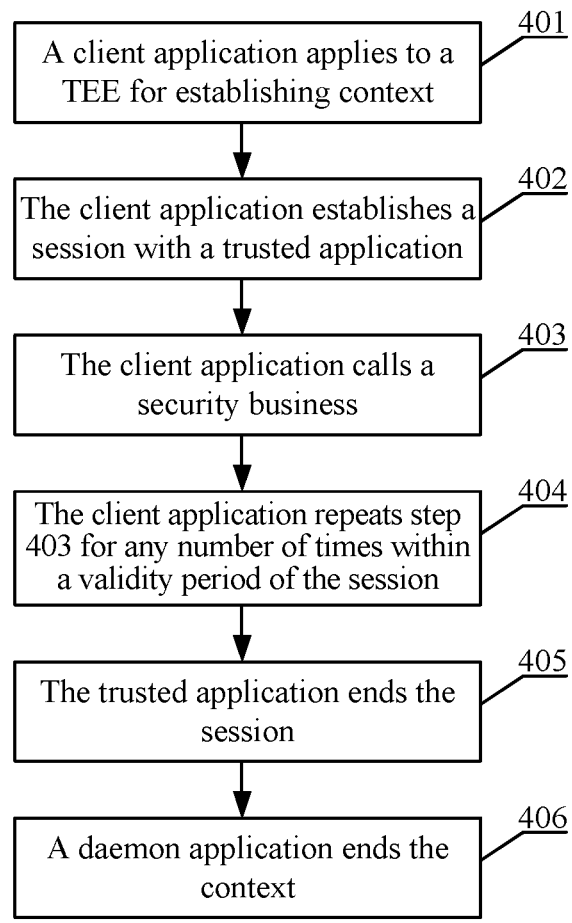
FIG. 4 is a flowchart of a trusted environment-based authentication protection method according to an embodiment of the present disclosure.

FIG. 4 is a flowchart of a trusted environment-based authentication protection method according to an embodiment of the present disclosure. The trusted environment-based authentication protection method according to the embodiment of the present disclosure will be described in detail below with reference to FIG. 4.

Figure 5:
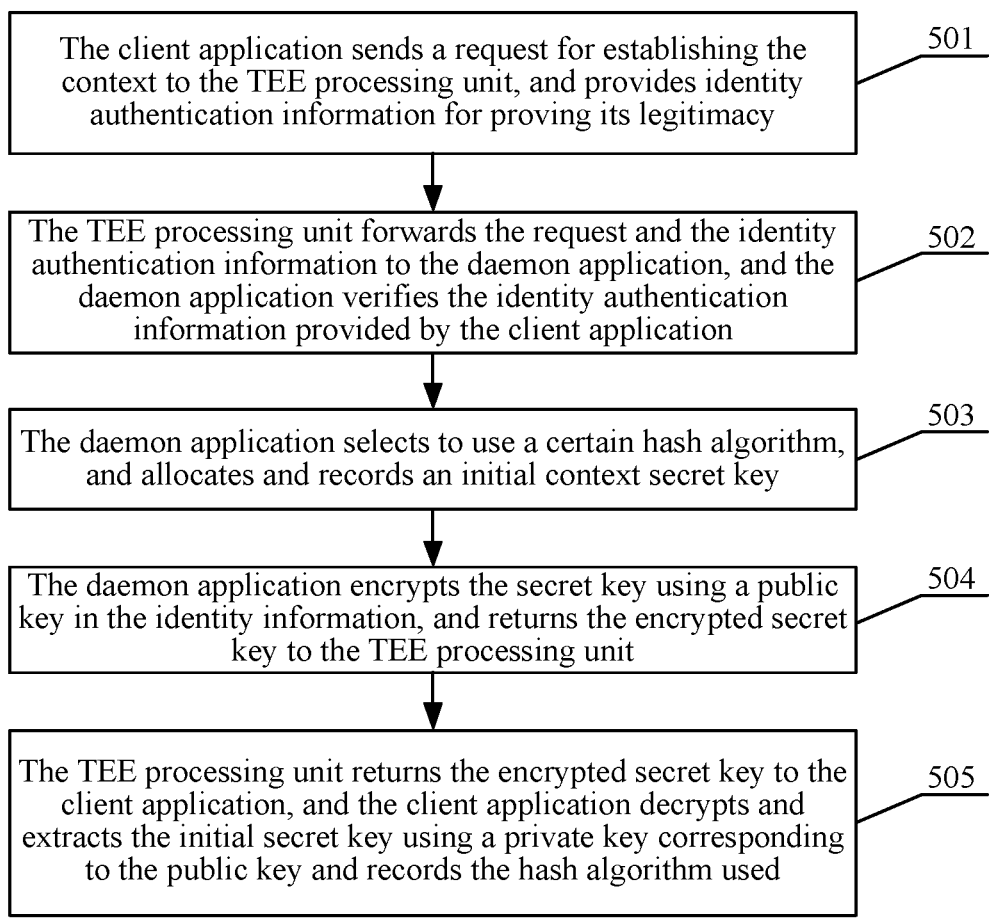
FIG. 5 is a flowchart of context establishment according to an embodiment of the present disclosure.

In step 401, a client application 302 applies to a TEE processing unit 303 for establishing context. FIG. 5 is a flowchart of context establishment according to an embodiment of the present disclosure. Referring to FIG. 5, the step in which the client application 302 applies to the TEE processing unit 303 for establishing the context includes steps described below.

In step 501, the client application 302 sends a request for establishing the context to the TEE processing unit 303, and provides identity authentication information for proving its legitimacy. In step 502, the TEE processing unit 303 forwards the request and the identity authentication information to the daemon application 304, and the daemon application 304 verifies the identity authentication information provided by the client application 304.

In step 503, the daemon application 304 selects to use a certain HASH algorithm, and allocates and records an initial context secret KEY which is a verification secret key used in a subsequent interaction process. The hash algorithm may also be other algorithms for making information secure, such as symmetric or asymmetric encryption algorithms.

In step 504, the daemon application 304 encrypts the secret key using a public key in the identity information provided by the client application 302, and returns the encrypted secret key to the TEE processing unit 303.

The KEY in the TEE has to be randomly generated, and the selected hash algorithm is HMAC_SHA256, HMAC_SHA512 or MD5, which depends on the selection of the daemon application 304.

In step 505, the TEE processing unit 303 returns the encrypted secret key to the client application 302, and the client application 302 decrypts and extracts the initial secret key using a private key corresponding to the public key in the identity authentication information and records the hash algorithm used.

Figure 6:
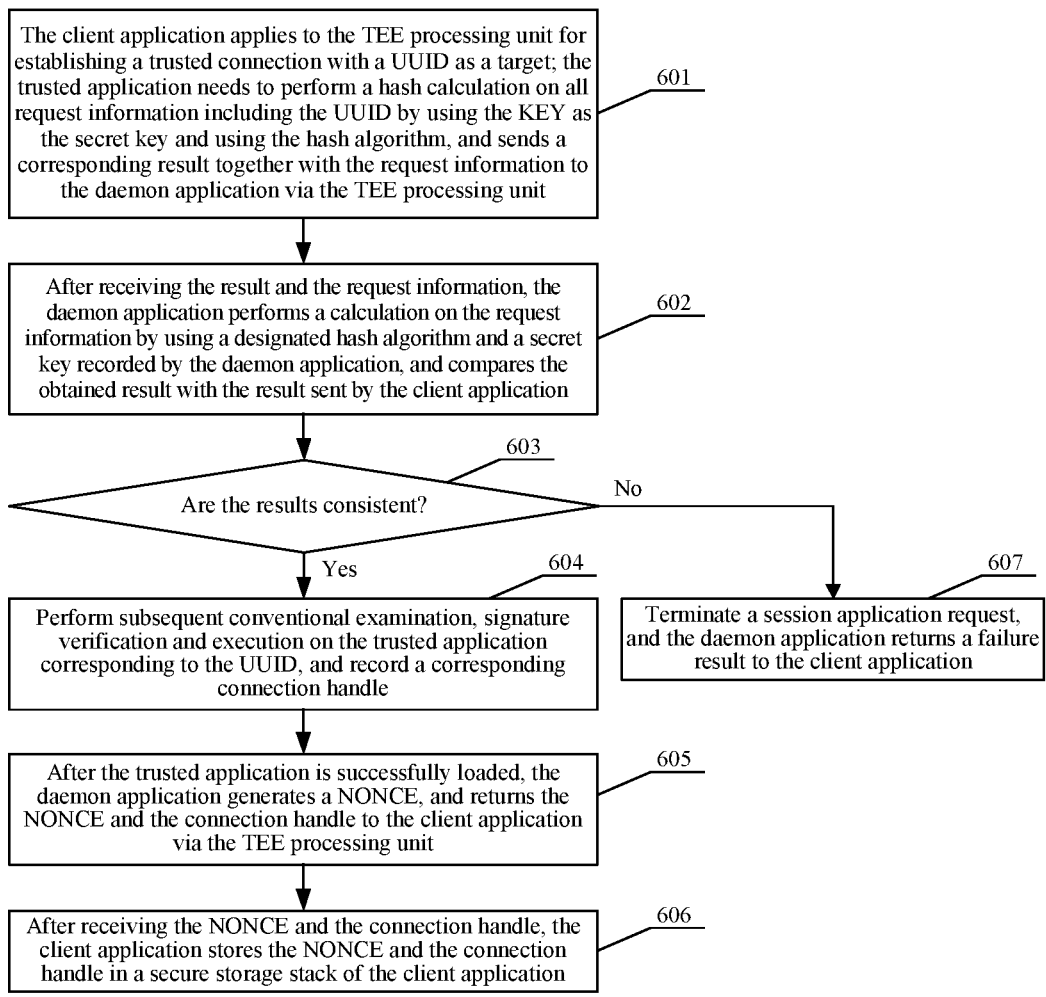
FIG. 6 is a flowchart of connection creation according to an embodiment of the present disclosure.

In step 402, the client application 302 establishes a session with the TEE processing unit 303. FIG. 6 is a flowchart of connection creation according to an embodiment of the present disclosure. Referring to FIG. 6, the process in which the client application 302 establishes the session with the TEE processing unit 303 includes steps described below.

In step 601, the client application 302 applies to the TEE processing unit 303 for establishing a trusted connection with a universally unique identifier (UUID) as a target; trusted application 305 needs to perform a hash calculation on all request information including the UUID by using the KEY as the secret key and using the hash algorithm, and sends a corresponding result together with the request information to the daemon application 304 via the TEE processing unit 303.

In step 602, after receiving the result and the request information, the daemon application 304 performs a calculation on the request information by using a designated hash algorithm and a secret key recorded by the daemon application 304, and compares the obtained result with the result sent by the client application 302.

In step 603, if the results are inconsistent, step 607 is performed; if the results are consistent, the next step is performed.

In step 604, subsequent conventional examination, signature verification and execution are performed on the trusted application 305 corresponding to the UUID, and a corresponding connection handle is recorded.

In step 605, after the trusted application is successfully loaded, the daemon application 304 generates a number used once (NONCE), and returns the NONCE and the connection handle to the client application 302 via the TEE processing unit 303. The NONCE has to be randomly generated.

In step 606, after receiving the NONCE and the connection handle, the client application 302 stores the NONCE and the connection handle in a secure storage stack of the client application 302 to be used in subsequent operations.

In step 607, a session application request is terminated, and the daemon application 304 returns a failure result to the client application 302.

Figure 7:
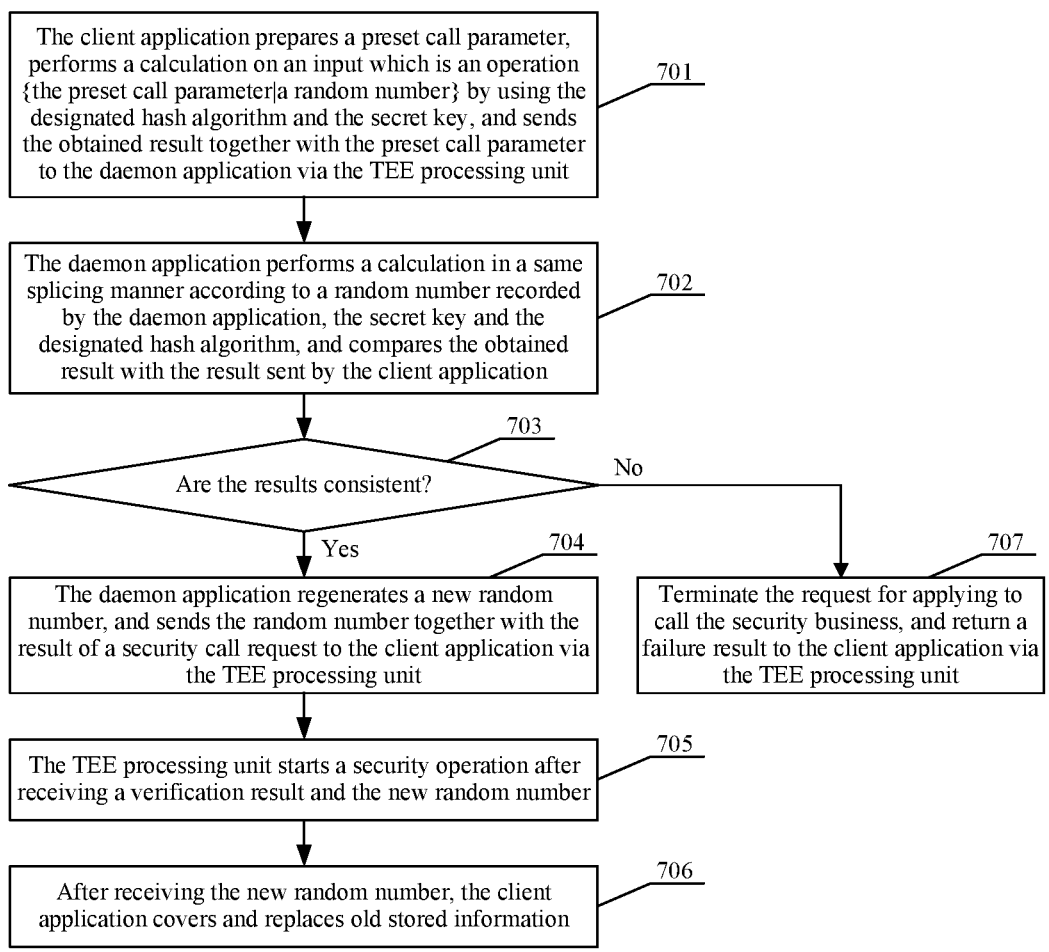
FIG. 7 is a flowchart in which a security business is called according to an embodiment of the present disclosure.

In step 403, the client application 302 calls a security business. FIG. 7 is a flowchart in which a security business is called according to an embodiment of the present disclosure. Referring to FIG. 7, the process in which the client application 302 calls the security business includes steps described below.

In step 701, the client application 302 prepares a preset call parameter (PARAM), performs a calculation on an input which is an operation {the preset call parameter|a random number} by using the designated hash algorithm and the secret key, and sends the obtained result together with the preset call parameter to the daemon application 304 via the TEE processing unit 303.

In step 702, the daemon application 304 performs a calculation in a same splicing manner according to a random number recorded by the daemon application 304, the secret key and the designated hash algorithm, and compares the obtained result with the result sent by the client application 302.

In step 703, if the results are inconsistent, step 707 is performed; if the results are consistent, the next step is performed.

In step 704, the daemon application 304 regenerates a new random number, and sends the random number together with the result of a security call request to the client application 302 via the TEE processing unit 303.

In step 705, the TEE processing unit 303 starts a security operation after receiving a verification result and the new random number.

In step 706, after receiving the new random number, the client application 302 covers and replaces old stored information, that is, the random number in step 402.

In step 707, the request for applying to call the security business is terminated, and a failure result is returned to the client application via the TEE processing unit 303.

In step 404, the client application 302 repeats step 403 for any number of times within a validity period of the session. Processing of the client application on the preset call parameter, the random number, the secret key, the hash algorithm, and comparisons of the daemon application 303 on hash calculation results and regeneration of the random number are the same as those in step 403.

Figure 8:
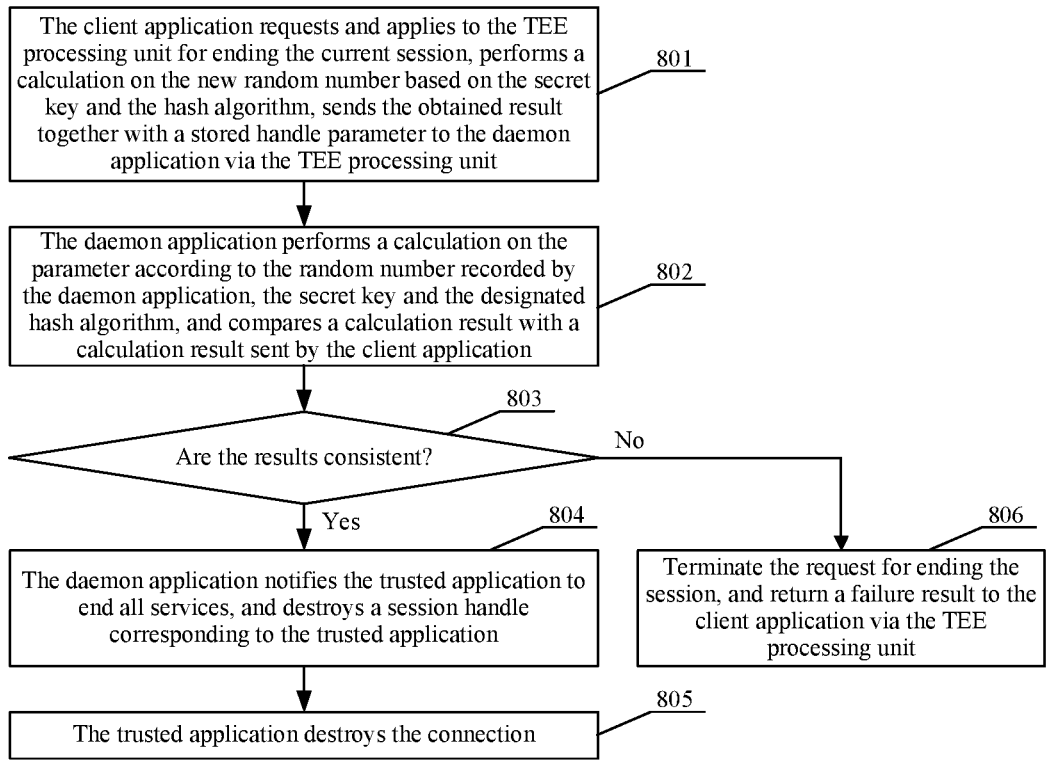
FIG. 8 is a flowchart in which a connection is closed and destroyed according to an embodiment of the present disclosure.

In step 405, the trusted application 305 ends the session. FIG. 8 is a flowchart in which a connection is closed and destroyed according to an embodiment of the present disclosure. Referring to FIG. 8, the process in which the trusted application 305 ends the session (closes and destroys the connection) includes steps described below.

In step 801, after completing all security business requests, the client application 302 requests and applies to the TEE processing unit 303 for ending the current session, performs a calculation on the new random number based on the secret key and the hash algorithm, and sends the obtained result together with a stored handle parameter to the daemon application 304 via the TEE processing unit 303.

In step 802, the daemon application 304 performs a calculation on the parameter according to the random number recorded by the daemon application 304, the secret key and the designated hash algorithm, and compares a calculation result of the daemon application 304 with a calculation result sent by the client application 302.

In step 803, if the results are inconsistent, step 806 is performed; if the results are consistent, the next step is performed.

In step 804, the daemon application 304 notifies the trusted application 305 to end all services, and destroys a session handle corresponding to the trusted application 305.

In step 805, the trusted application 305 destroys the connection. The TEE processing unit 303 does not require the daemon application to generate or store any random number.

In step 806, the request for ending the session is terminated, and a failure result is returned to the client application 302 via the TEE processing unit 303.

In addition, after the result is returned, a connection closing process of the client application 302 ends. Since the connection handle and the random number are invalid, the security business request for closing the connection is issued merely once by the client application 302.

Figure 9:
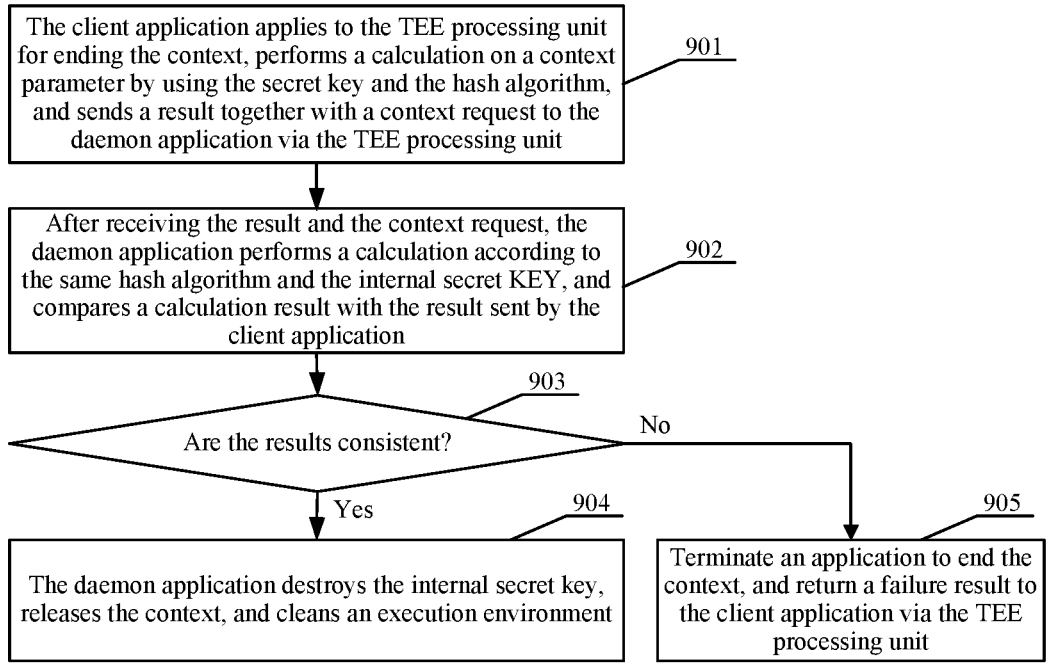
FIG. 9 is a flowchart in which context is ended and destroyed according to an embodiment of the present disclosure.

In step 406, the daemon application 304 ends the context. FIG. 9 is a flowchart in which context is ended and destroyed according to an embodiment of the present disclosure. Referring to FIG. 9, the process in which the daemon application 304 ends and destroys the context includes steps described below.

In step 901, the client application 302 applies to the TEE processing unit 303 for ending the context, performs a calculation on a context parameter by using the secret key and the hash algorithm, and sends a result together with a context request to the daemon application 304 via the TEE processing unit 303.

In step 902, the daemon application 304 performs a calculation according to the designated hash algorithm and the internal secret key, and compares a calculation result of the daemon application 304 with the result sent by the client application 302.

In step 903, if the results are inconsistent, step 905 is performed; if the results are consistent, the next step is performed.

In step 904, the daemon application 304 destroys the internal secret key, releases the context, and cleans an execution environment.

In step 905, an application to end the context is terminated, and a failure result is returned to the client application 302 via the TEE processing unit 303.

At this time, all trusted interactive session processes are ended.

In addition, in step 402 and step 403, before they are returned to the client application 302, the random number is updated, and whether the secret key and the hash algorithm used in the subsequent session need to be updated are determined according to a self-defined security policy. An update policy of the secret key may be an update based on a time interval or an update based on the number of times the secret key is returned to the client application 302. An update timing may be selected by the daemon application 304. For example, the secret key is actively updated after the session process ends, or the secret key may be dynamically updated in a process of calling the security business.

In addition, if the TEE processing unit 303 considers that the rights corresponding to the trusted application 305 needs a higher security policy, the hash algorithm may also be dynamically updated. After receiving the returned result, the client application 302 covers the original secret key and hash algorithm according to updated content.

According to the embodiments of the present disclosure, a calculation is performed on a parameter used in a connection establishment process by using the hash algorithm and the context secret key, a calculation is performed in a function call process, that is, the process of calling the security business, by using the random number provided by the daemon application as an auxiliary parameter, and comparisons are performed by the daemon application 304 to ensure complete and trusted parameters in each step of a connection process and the continuous and trusted connection process, thereby ensuring a complete, continuous and trusted interaction process between the client application 302 and the TEE processing unit 303.

An embodiment of the present disclosure further provides a trusted environment-based authentication protection method. The method includes steps descried below.

A client application in a common environment acquires a security parameter for an information interaction with a trusted application and/or a daemon application in a trusted environment.

The client application processes information to be sent to the trusted application and/or the daemon application based on the security parameter, and sends the information subjected to security processing to the trusted application and/or the daemon application.

The client application processes information sent by the trusted application and/or the daemon application based on the security parameter.

In this embodiment, the client application is an application in the common environment, and the trusted application and the daemon application are applications in the trusted environment. The trusted environment here may be a secure application environment subjected to security authentication. The security and a security level of the trusted environment are higher than the security and a security level of the common environment.

In this embodiment, the client application, the trusted application and the daemon application will acquire the security parameter for information interactions therebetween. The security parameter here may include a security algorithm and/or a security key. The security algorithm may include an encryption algorithm, an integrity algorithm, and the like, for example, a hash algorithm and the like. The security key may include an encryption key, a random number, an integrity key and the like.

Optionally, the step in which the client application in the common environment acquires the security parameter for the information interaction with the trusted application and/or the daemon application in the trusted environment includes steps described below.

The client application sends an application to establish context to a TEE processing unit.

The TEE processing unit receives a request for establishing the context sent by the client application, where the request includes identity authentication information.

The daemon application verifies the identity authentication information, and creates and encrypts an initial context secret key by using a security algorithm designated by the TEE processing unit.

The client application decrypts and extracts the initial context secret key, and records the security algorithm used.

The security parameter includes the security algorithm and/or the security key, and the security key includes the initial context secret key.

Optionally, the step in which the client application in the common environment acquires the security parameter for the information interaction with the trusted application and/or the daemon application in the trusted environment includes steps described below.

The client application sends a request for establishing a trusted connection with a universally unique identifier (UUID) as a target.

The trusted application performs a calculation on the UUID by using the security algorithm designated by the TEE processing unit based on a secret key, and sends a calculation result together with the UUID to the daemon application.

The daemon application verifies the calculation result, performs examination, signature verification and execution on the trusted application corresponding to the UUID, records a corresponding connection handle, and generates a number used once (NONCE).

The client application receives and stores the connection handle and the NONCE.

Optionally, the step in which the client application performs a calculation on an input according to a hash algorithm by using a call parameter and a random number as the input, and sends a calculation result together with a preset parameter to the daemon application includes a step described below.

The client application performs the calculation on the input according to the security algorithm by using the call parameter and the random number as the input, and sends a calculation result together with the preset parameter to the daemon application.

The step in which the client application in the common environment acquires the security parameter for the information interaction with the trusted application and/or the daemon application in the trusted environment further includes steps described below.

The daemon application verifies the calculation result and generating a new random number. The client application receives the new random number, and covers and replaces old stored information, where the random number is one of security parameters for communication with the daemon application next time.

Optionally, the step in which the daemon application verifies the calculation result includes that the daemon application performs a calculation on the preset parameter according to a random number recoded by the daemon application, the secret key and the security algorithm designated by the TEE processing unit, and compares a calculation result of the daemon application with the calculation result sent by the client application.

Optionally, the step in which the client application performs a calculation on an input according to a hash algorithm by using a call parameter and a random number as the input, and sends a calculation result together with a preset parameter to the daemon application includes a step described below.

The client application performs the calculation on the input based on the secret key and the harsh algorithm by using the random number as the input, and sends a calculation result together with a handle parameter to the daemon application, where the calculation result is verified by the daemon application, and the daemon application notifies the trusted application to end all services and destroys a handle corresponding to the trusted application after verification.

An embodiment of the present disclosure provides a computer storage medium, which is configured to store computer-executable instructions for executing the trusted environment-based authentication protection method in one or more technical solutions described above.

The computer storage medium may be a portable storage device, a read-only memory (ROM), a random access memory (RAM), a magnetic disk, an optical disk or another medium capable of storing program codes, or may optionally be a non-transient storage medium or a non-volatile storage medium.

It is to be understood by those skilled in the art that the above are merely preferred embodiments of the embodiments of the present disclosure and not intended to limit the embodiments of the present disclosure. Although the embodiments of the present disclosure are described in detail with reference to the above-mentioned embodiments, those skilled in the art can still modify the technical solutions described in the above-mentioned embodiments, or make equivalent substitutions on part of the technical features therein. Any modifications, equivalent substitutions, improvements and the like made within the spirit and principle of the present disclosure are within the scope of the present disclosure.

What is claimed is:

1. A trusted environment-based authentication protection method, comprising:
    applying, by a client application, to a trusted execution environment (TEE) processing unit for establishing context;
    establishing a session with a trusted application by the client application;
    calling a security business by the client application;
    ending the session by the trusted application; and
    ending the context by a daemon application;
    wherein the establishing the session with the trusted application by the client application comprises:
    receiving, by the TEE processing unit, a request sent by the client application for establishing a trusted connection with a universally unique identifier (UUID) as a target;
    performing, by the trusted application, a calculation on the UUID by using a hash algorithm designated by the TEE processing unit based on a secret key, and sending a calculation result together with the UUID to the daemon application;
    verifying the calculation result by the daemon application, performing, by the daemon application, examination, signature verification and execution on the trusted application corresponding to the UUID, recording a corresponding connection handle, and generating a number used once (NONCE); and
    receiving and storing the connection handle and the NONCE by the client application.

2. The trusted environment-based authentication protection method of claim 1, wherein
    the applying, by the client application, to the TEE processing unit for establishing the context comprises:
    receiving, by the TEE processing unit, a request for establishing the context sent by the client application, wherein the request comprises identity authentication information;
    verifying, by the daemon application, the identity authentication information, and creating and encrypting, by the daemon application, an initial context secret key by using a hash algorithm designated by the TEE processing unit; and
    decrypting and extracting, by the client application, the initial context secret key, and recording the hash algorithm used.

3. The trusted environment-based authentication protection method of claim 1, wherein
    the calling the security business by the client application comprises:
    performing, by the client application, a calculation on an input according to a hash algorithm by using a call parameter and a random number as the input, and sending a calculation result together with a preset parameter to the daemon application;
    verifying the calculation result and generating a new random number by the daemon application;
    forwarding a verification result and the new random number to the client application by the TEE processing unit; and
    receiving the new random number, by the client application, and covering and replacing old stored information.

4. The trusted environment-based authentication protection method of claim 3, wherein
    the verifying the calculation result by the daemon application comprises: performing, by the daemon application, a calculation on the preset parameter according to a random number recoded by the daemon application, a secret key, and a hash algorithm designated by the TEE processing unit, and comparing a calculation result of the daemon application with the calculation result sent by the client application.

5. The trusted environment-based authentication protection method of claim 1, wherein
    the ending the session by the trusted application comprises:
    performing, by the client application, a calculation on an input based on a secret key and a hash algorithm by using a random number as the input, and sending a calculation result together with a handle parameter to the daemon application; and
    verifying the calculation result by the daemon application, notifying the trusted application to end all services, and destroying a handle corresponding to the trusted application.

6. The trusted environment-based authentication protection method of claim 5, wherein
    the verifying the calculation result by the daemon application comprises: performing, by the daemon application, a calculation on the handle parameter according to a random number recoded by the daemon application, the secret key and a hash algorithm designated by the TEE processing unit, and comparing a calculation result of the daemon application with the calculation result sent by the client application.

7. The trusted environment-based authentication protection method of claim 1, wherein
    the ending the context by the daemon application comprises:
    performing, by the client application, a calculation on a context parameter by using a secret key and a hash algorithm, and sending a calculation result together with the context parameter to the daemon application through the TEE processing unit; and
    verifying the calculation result by the daemon application, and destroying the secret key inside the TEE processing unit by the daemon application, releasing the context, and cleaning an execution environment.

8. The trusted environment-based authentication protection method of claim 7, wherein
    the verifying the calculation result by the daemon application comprises: performing, by the daemon application, a calculation on the context parameter according to a random number recoded by the daemon application, the secret key and a hash algorithm designated by the TEE processing unit, and comparing a calculation result of the daemon application with the calculation result sent by the client application.

9. A non-transitory computer storage medium, which is configured to store computer-executable instructions for executing the trusted environment-based authentication protection method of claim 1.

* * * * *